United States Patent
Rolla et al.

(10) Patent No.: US 9,096,299 B2
(45) Date of Patent: Aug. 4, 2015

(54) ROOSTER TAIL SUPPRESSION APPARATUS

(71) Applicant: Twin Disc, Inc., Racine, WI (US)

(72) Inventors: Philip Rolla, Bruzella (CH); Marzio Porro, Como (IT)

(73) Assignee: Twin Disc, Inc., Racine, WI (US)

( * ) Notice: Subject to any disclaimer, the term of this patent is extended or adjusted under 35 U.S.C. 154(b) by 0 days.

(21) Appl. No.: 14/215,946

(22) Filed: Mar. 17, 2014

(65) Prior Publication Data

US 2014/0271122 A1      Sep. 18, 2014

Related U.S. Application Data

(60) Provisional application No. 61/791,023, filed on Mar. 15, 2013.

(51) Int. Cl.
| | |
|---|---|
| F03B 3/12 | (2006.01) |
| B63H 1/28 | (2006.01) |
| F03B 13/26 | (2006.01) |
| B63H 1/18 | (2006.01) |

(52) U.S. Cl.
CPC ............. *B63H 1/28* (2013.01); *F03B 13/264* (2013.01); *B63H 2001/185* (2013.01); *Y02E 10/28* (2013.01)

(58) Field of Classification Search
CPC ..... B63H 2001/185; B63H 11/11; B63H 1/28
USPC .......... 440/66–72; 114/280–282, 146, 145 R, 114/145 A, 166, 162, 163
See application file for complete search history.

(56) References Cited

U.S. PATENT DOCUMENTS

| | | | |
|---|---|---|---|
| 2,020,788 A | | 11/1935 | Konstantinoff |
| 2,369,279 A | * | 2/1945 | Carnaghan et al. ........... 114/166 |
| 2,601,837 A | * | 7/1952 | Dean ............................ 114/166 |
| 2,998,795 A | * | 9/1961 | Downie et al. ............ 114/145 A |
| 3,742,895 A | | 7/1973 | Horiuchi |
| 4,443,202 A | | 4/1984 | Arena |
| 4,487,152 A | | 12/1984 | Larson |
| 4,808,132 A | | 2/1989 | Douglas |
| 4,976,638 A | | 12/1990 | Grinde |
| 5,249,994 A | | 10/1993 | Finkl |
| 5,549,071 A | | 8/1996 | Pigeon et al. |
| 5,588,390 A | | 12/1996 | French |
| 5,628,272 A | | 5/1997 | Thomas |
| 5,667,415 A | | 9/1997 | Arneson |
| 5,860,384 A | | 1/1999 | Castillo |
| 6,302,050 B1 | | 10/2001 | Ziehm |
| 2006/0234569 A1 | * | 10/2006 | Lin .............................. 440/66 |
| 2011/0011326 A1 | | 1/2011 | Robinson et al. |

FOREIGN PATENT DOCUMENTS

| | | |
|---|---|---|
| EP | 0869899 | 11/2003 |
| RU | 19811 | 10/2001 |
| RU | 97705 | 9/2010 |

* cited by examiner

*Primary Examiner* — Edwin Swinehart
(74) *Attorney, Agent, or Firm* — Boyle Fredrickson S.C.

(57) ABSTRACT

A modifier may be used to prevent formation of a rooster tail when surface drive propellers are used with marine vessels. The modifier may be retractable by attaching it to the transom of the marine vessel or fixed-mounted by attaching it to the drive housing. The modifier changes the direction of the rooster tail so it flows substantially parallel to the surface of the water and hull of the marine vessel.

17 Claims, 5 Drawing Sheets

ROOSTER TAIL SUPPRESSION APPARATUS

CROSS-REFERENCE TO RELATED APPLICATIONS

This application claims priority under 35 USC §1.119(e) to U.S. Provisional Patent Application Ser. No. 61/791,023, filed Mar. 15, 2013, entitled Rooster Tail Suppression Apparatus. The subject matter of this application is hereby incorporated by reference in its entirety

BACKGROUND OF THE INVENTION

1. Field of the Invention

The present invention relates in general to the field of surface drive propellers for marine vessels, and more particularly, to an apparatus for deflecting and shaping a rooster tail formed by a surface drive propeller.

2. Discussion of the Related Art

Surface drive propellers are unique in the art of marine propulsion. Such drives operate half in water and half out of the water in the planing wake region of a boat just behind the transom. Having the propeller at the surface level reduces drag and reduces the vessel's draft, making the surface drive suitable for many applications where the owner is looking to reduce fuel costs, increase speed, and create a more efficient vessel over other types of submersed drives such as outboard, inboard, outboard/inboard, and pod applications. For these reasons, for example, marine vessels equipped with surface drive propellers are employed by the military organizations of several countries.

Whether employing surface or other types of drives, propulsion devices often produce unique byproducts such as wake formations. Surface drive propellers in particular are known to produce the unique byproduct of a large rooster tail, unlike other types of propellers/drives.

The large rooster tail formed by a surface drive propeller is very large and forms an arch of water spray that is large enough to be detected by radar. Possible radar detection exposes the marine vessel, and its crew, to potential danger. This is a particular concern for military applications.

While radar detection of a rooster tail formed by surface drive propellers may be acceptable for an average consumer, it may be undesirable for other reasons as well. For example, a large rooster tail may impose a safety hazard to people being towed behind the marine vessel during waterskiing or similar activity. The rooster tail may impede vision or present a general nuisance. A large rooster tail may also be a hazard to other marine vessel operators, as it may impede the operator's vision. What is therefore needed is a device that can minimize the rooster tail effects of surface drive propeller applications. What is also needed is a device that can prevent a rooster tail from forming that is easily deployed, and easily retracted when deflection is not needed.

SUMMARY AND OBJECTS OF THE INVENTION

The preferred embodiments are directed to minimize the adverse effects of a rooster tail formed from marine vessels powered with a surface drive propeller. An effect of the present invention is to deflect and shape the rooster tail. This shaping may be accomplished with an apparatus including a modifier supported either by the transom of the marine vessel, or the drive housing of the surface drive propeller. The modifier may include a modifier housing and a plurality of vanes rigidly fixed to the modifier housing. The modifier housing and the vanes may be configured to collectively deflect the entire rooster tail in a direction substantially parallel to a bottom surface of the marine vessel. In this regard, the adverse consequences of operating a marine vessel with a large rooster tail are minimized.

In one embodiment, the modifier housing may include a grid of rectangular channels with a plurality of vertical and horizontal vanes. The vertical vanes may be oriented parallel to one another, and the horizontal vanes may also be oriented parallel to one another to form the grid. An opening formed on a leading edge of each channel facing the transom and an opening on a trailing edge of each channel opposite the leading edge forms a path for the water making the rooster tail to travel through. The vanes and channels may be configured to flow water making up the rooster tail into the leading edge and out of the trailing edge of the channels. The channels work to deflect the rooster tail generated by the surface drive in a direction substantially parallel to a bottom surface of the marine vessel.

In order to attach the modifier to the marine vessel, at least one attachment member may be used to join the modifier to the transom of the marine vessel. The attachment member may be configured to articulate the modifier into a deployed position to deflect the rooster tail, and a retracted position to not deflect the rooster tail.

In another embodiment, the modifier may include a first end and a second end opposite the first end. The first and second end may share a common, horizontal plane. The modifier may have a curvature creating a center portion between the first and second end. The center portion may also be above the common, horizontal plane due to the curvature. The modifier housing may also have a leading edge facing the transom and a trailing edge opposite the leading edge with a curvature. This curvature helps deflect the rooster tail. A plurality of vanes may be rigidly fixed to the center portion of the modifier housing, extending towards the common, horizontal plane that also helps direct the deflected rooster tail. The modifier is attached to the drive housing of the marine vessel and is configured to move with the drive housing as it moves for steering purposes.

A method of suppressing a rooster tail generated by a surface drive propeller is also herein disclosed. The method preferably uses one of the above-mentioned devices, but may use any other device as well. A modifier may be supported by at least one of a transom of a marine vessel and a drive housing. The modifier may include a modifier housing and a plurality of vanes rigidly fixed to the modifier housing. By rigidly fixed it is meant that the vanes do not move once they are installed into position. The modifier may be positioned so the modifier housing and the vanes collectively deflect the entire rooster tail in a direction substantially parallel to a bottom surface of the marine vessel or parallel to the surface of the water.

In one embodiment, the modifier may include a grid of channels formed with vanes rigidly fixed to a modifier housing at approximately right angles. The vanes may include a first plurality of parallel vanes vertically fixed to the modifier housing, and a second plurality of parallel vanes horizontally fixed to the modifier housing. The modifier may be attached to a transom of a boat with an attachment device, such that the channels are approximately parallel to the bottom of the hull. The attachment device may be configured to move the modifier between two positions, an engaged position by lowering the modifier and allowing the modifier to deflect the rooster tail in an approximately horizontal direction by passing the rooster tail through the channels, and a disengaged position by lifting the modifier sufficiently so the channels do not deflect the rooster tail. The non-deflected rooster tail includes a large, arch shaped water spray. The deflected rooster tail includes a horizontal spray only slightly above the water surface.

A first portion of the modifier may be attached to the transom with an articulating attachment such as a hinge, and be adjustable such that the modifier position may be set to optimally contact the rooster tail. Optimal contact may occur when the arched shape of the rooster tail is deflected and is changed to a more horizontal shape.

A plurality of channels may be formed with the first and second plurality vanes and the modifier housing. The channels may be configured to receive the rooster tail on one end and expel the rooster tail from an opposite end, forming a horizontal, deflected rooster tail only slightly above the water surface.

In another embodiment, the modifier may be attached to the drive housing. A curvature may be included in the modifier housing in both a vertical and horizontal axis to optimally deflect the rooster tail.

The modifier may be positioned such that it is placed in a position trailing a vertical plane intersecting the trailing face of the surface drive propeller. By trailing it is meant to define a direction opposite the travelling direction when the propeller is moving the vessel forward. By leading, it is meant to define the direction of travel when the propeller is moving the vessel forward.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore nonlimiting, embodiments illustrated in the drawings accompanying and forming apart of this specification, wherein like reference numerals designate the same elements in the several views, and in which.

Figure 1:
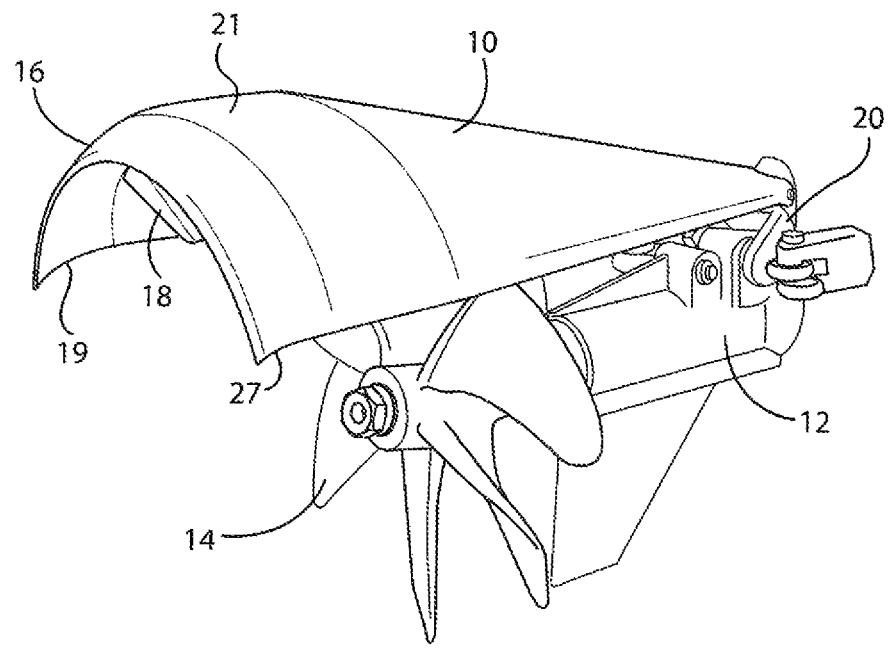
FIG. 1 illustrates a perspective view of a rooster tail modifier according to one embodiment.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected". "attached", or terms similar thereto are often used. They are not limited to direct connection but include connection through other elements where such connection is recognized as being equivalent by those skilled in the art.

DETAILED DESCRIPTION OF EMBODIMENTS

The present invention and the various features and advantageous details thereof are explained more fully with reference to the non-limiting embodiments described in detail in the following description.

Beginning with FIG. 1, a rooster tail modifier 10 is shown attached to a drive housing 12. Preferably, the modifier 10 is constructed of a composite material; however, any other material such as steel, aluminum, or wood may be used. The drive housing 12 includes a surface drive propeller 14. Traditionally, surface drives produce a very large, arched water spray referred to as a rooster tail. In order to suppress a rooster tail, the modifier 10 is attached to the drive housing 12 and changes the shape of the output water from the propeller from a large, arched water spray into a spray that is substantially parallel with respect to a bottom surface of the boat, such as the hull, or the water surface.

In order to more effectively deflect the rooster tail, a curved portion 16 is included on the end of modifier 10. This curved portion redirects the flow of water output from the propeller (s) so as to suppress a rooster tail from forming by causing the output water to contact the bottom surface of modifier 10. The modifier 10 is also formed with a center portion 21 that includes a curvature between a first end 19 and a second end 27 of the modifier 10. The curved center portion 21 may be shaped to "hug" the surface drive propeller 14. Preferably, the center portion hugs 120° to 180° of the surface drive propeller 14, although the center portion 21 may be formed larger or smaller.

Figure 2:
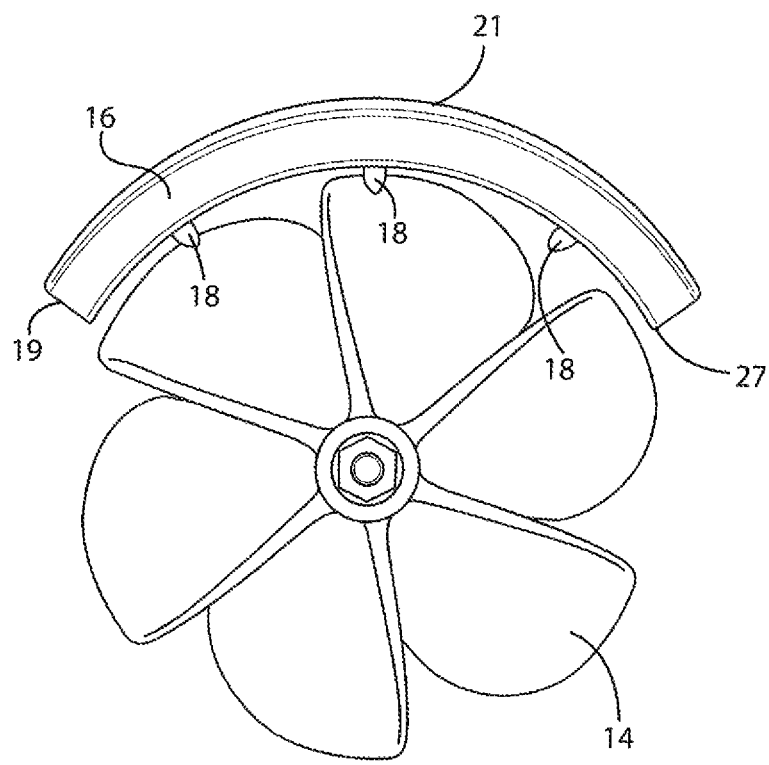
FIG. 2 illustrates a rear view of the rooster tail modifier of FIG. 1.

As shown in FIGS. 1 and 2, vanes 18 may be included on the bottom surface of modifier 10. The vanes 18 may extend from a center portion 21 of the modifier 10 to assist in directing the flow of the deflected rooster tail. Any number of vanes 18 may be included, Preferably, 4-5 vanes 18 are used in the modifier 10 to help direct and shape the rooster tail as it is deflected. The vanes 18 are rigidly attached to the center portion 21 of the modifier 10, such that once they are put in place they do not move with respect to the center portion 21.

Figure 3:
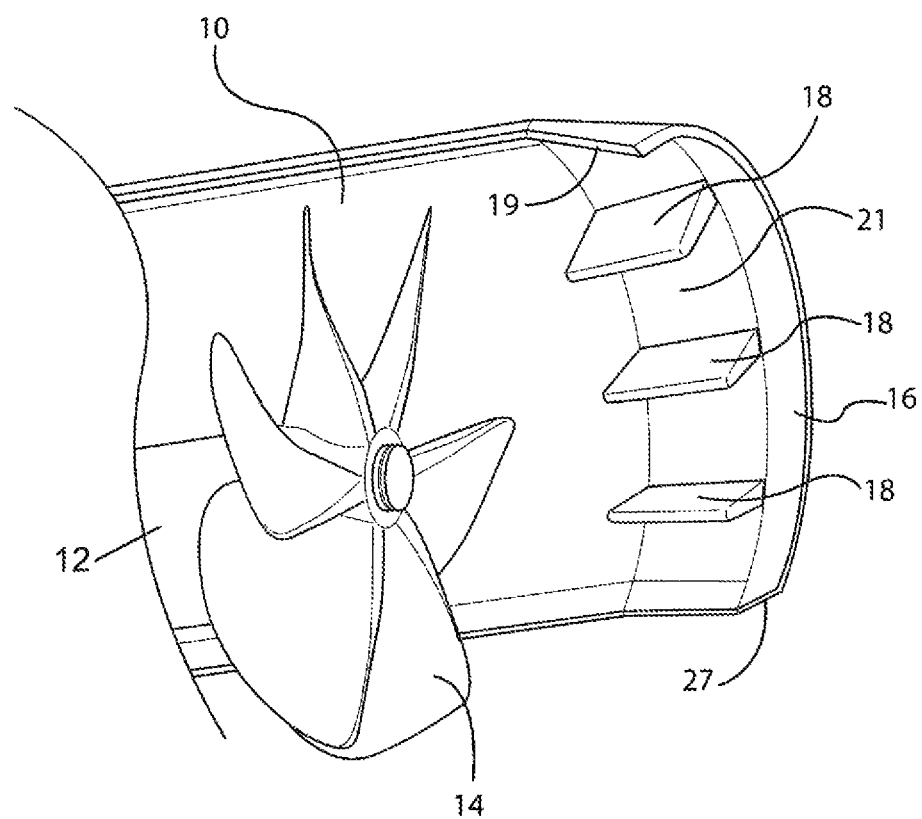
FIG. 3 illustrates a bottom view of the rooster tail modifier of FIG. 1.

Transitioning now to FIG. 3, a bottom view of the modifier 10 is shown. From this angle, the vanes 18 that help straighten and direct the flow of the output water are more clearly shown. Preferably, the modifier 10 is fixed to the drive housing 12 so that it moves with the drive housing as the marine vessel, which the modifier 10 is attached to, is trimmed and steered. The modifier 10 is preferably attached to the trim and steering cylinders on the drive housing 12, but may be attached on any portion of the drive housing 12. The modifier 10 may also be retrofitted onto existing surface driven marine vessels, or included on marine vessels during manufacture.

Figure 4:
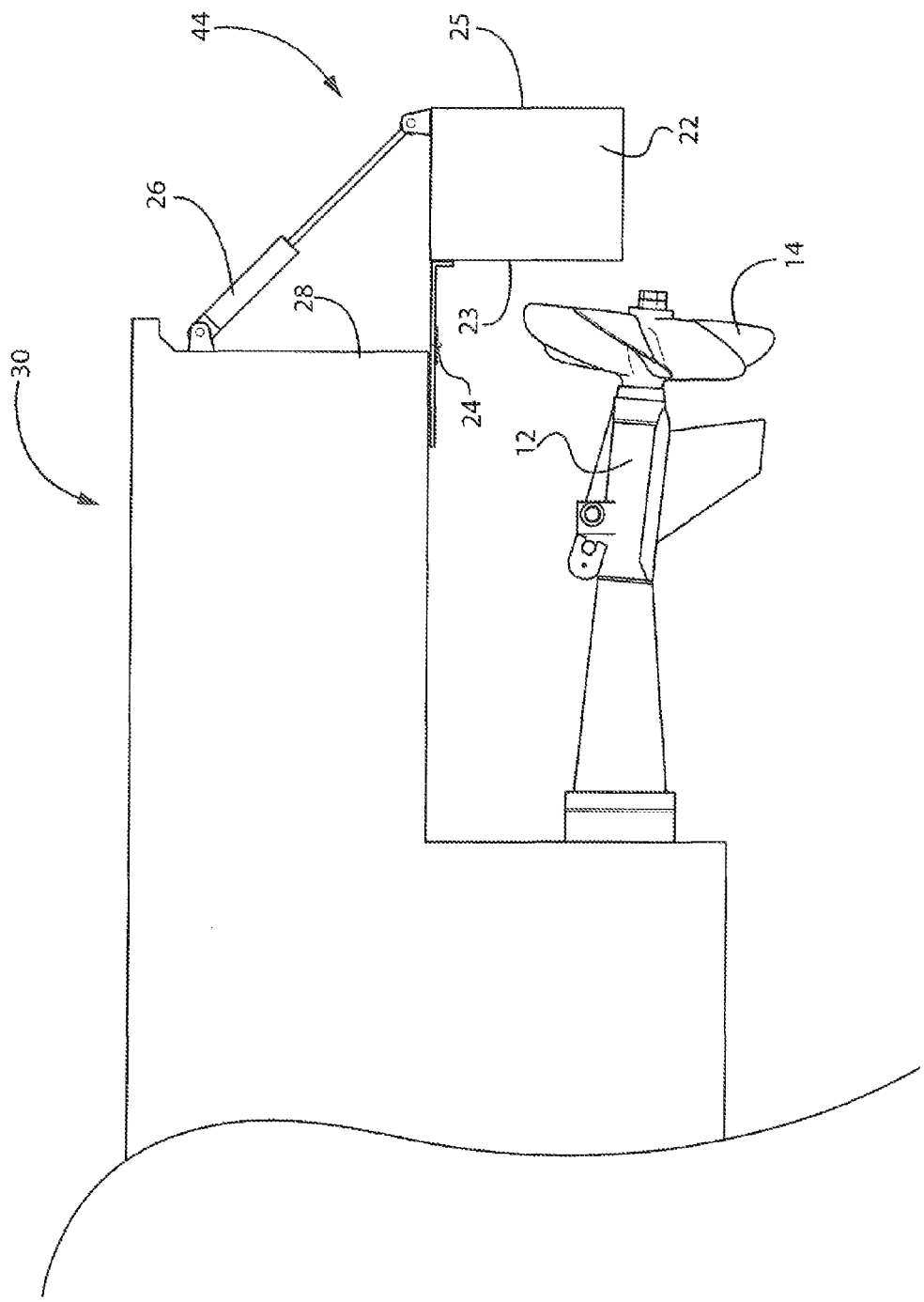
FIG. 4 illustrates a side view of a rooster tail modifier according to another embodiment.
Figure 5:
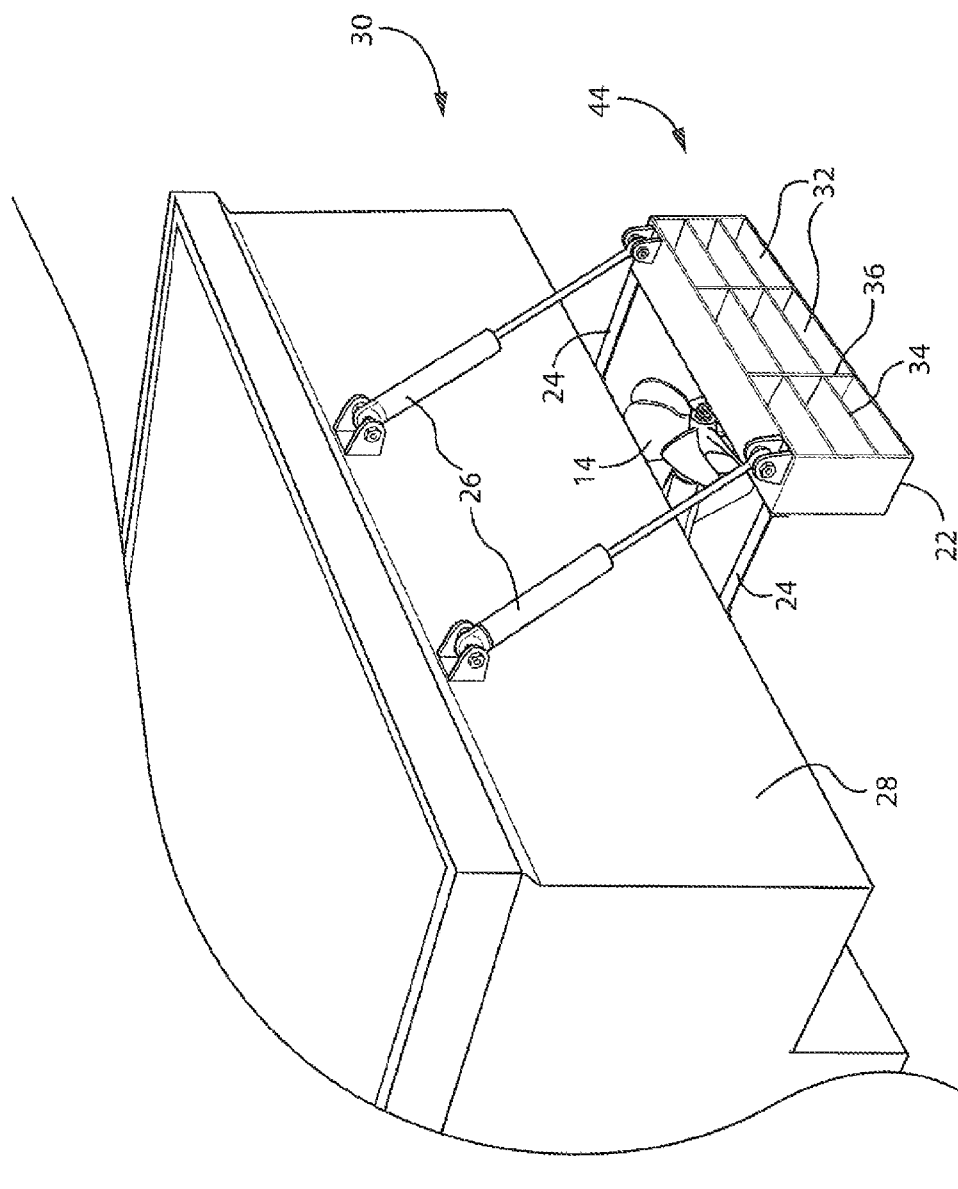
FIG. 5 illustrates a perspective view of the rooster tail modifier of FIG. 4.

A second embodiment, in the form of a grid modifier 44, is shown in FIG. 4. The grid modifier 44 is also used to deflect the flow of the output water so as to suppress a rooster tail from being formed by surface drive propeller 14. The grid modifier 44 includes a leading edge 23 and a trailing edge 25. In this embodiment, the grid modifier 44 is attached to the transom 28 of a marine vessel 30, and not the drive housing 12. One or more attachment cylinders 26 may be used to move the grid modifier 44 into position. A hinge 24 may be attached to a leading edge 23 of the grid modifier 44 so that the attachment cylinders 26 may be retracted and pivot the grid modifier 44 about the hinge 24. The hinge 24 and attachment cylinders 26 allow the grid modifier 44 to be placed in a deployed position as shown in FIGS. 4 and 5 as well as a retracted position in which the hinge 24 and attachment cylinders 26 rotate the grid modifier 24 approximately 90° so it does not contact the rooster tail. Retracting the grid modifier 44 is useful (e.g., reduce drag) when the deflection of the rooster tail is not needed such as when operating the vessel at low speeds.

Moving on to FIG. 5, a perspective view of the grid modifier 44 attached to the transom 28 of the marine vessel 30 is shown. The grid modifier 44 may be formed in any size or shape including cylindrical, oval, rectangular, irregular, and square. Preferably, the grid modifier 44 is as wide as about 0.75 to 1.5 times the diameter of the surface drive propeller 14. The grid modifier 44 is also preferably as high as about 0.25 to 0.75 times the diameter of the surface drive propeller 14. The grid modifier 44 is also preferably as deep as about 0.25 to 0.5 times the diameter of the surface drive propeller 14. While these are the preferable size dimensions, any dimension that yields the desired rooster tail minimizing effect may be used to deflect the rooster tail. For example, when multiple propellers are used, a grid modifier 44 may be shaped as wide as the entire transom 28 of the marine vessel 30 or multiple grid modifiers 44 may be employed for each respective drive. Alternatively, the grid modifier 44 may be attached directly to the drive housing 12 and not be movable to a retracted and deployed position.

The grid modifier 44 preferably includes a plurality of horizontal vanes 34 and a plurality of vertical vanes 36. The horizontal vanes 34 and vertical vanes 36 preferably intersect each other forming right angles. A modifier housing 22 may encase the vertical vanes 36 and horizontal vanes 34 forming multiple channels 32. The channels 32 function as a guide to deflect the rooster tail. As a rooster tail is generated by the surface drive propeller 14, the water enters each channel 32 at the leading edge 23 and exits the channel 32 at the trailing edge 25. As the rooster tail flows through the channel, the rooster tail is deflected to flow substantially parallel with respect to the bottom surface of the boat or the surface of the water.

The embodiment shown in FIG. 5 includes a total of nine channels formed in the grid modifier 44. Any configuration of vertical and horizontal vanes 34, 36 may be used to form any number of channels 32. In fact, the grid modifier 44 may include only horizontal vanes 34 eliminating the vertical vanes 36. In such a configuration, the channels would be formed between each horizontal vane 34 and also between each horizontal vane 34 and the modifier housing 22. Preferably, the grid modifier 44 is positioned slightly above the centerline of the surface drive propeller 14 or vertically raised, for example, a quarter of the radius from the centerline of the surface drive propeller 14. The grid modifier 44 may also be formed out of any material such as aluminum, steel, wood, but is preferably composite.

The grid modifier 44 may have a slight effect on the trim of the marine vessel at low speeds when a rooster tail does not form; however, once the marine vessel 30 is traveling at planing speeds, the grid modifier 44 will typically have no effect on the trim of the vessel.

While the preferred position of each vertical vane 36 and horizontal vane 34 form right angles with one another, they may be oriented in any position such that any angle is formed. The vertical vanes 36 and horizontal vanes 34 may also be individually movable to fine tune the deflection of the rooster tail.

Figure 6:
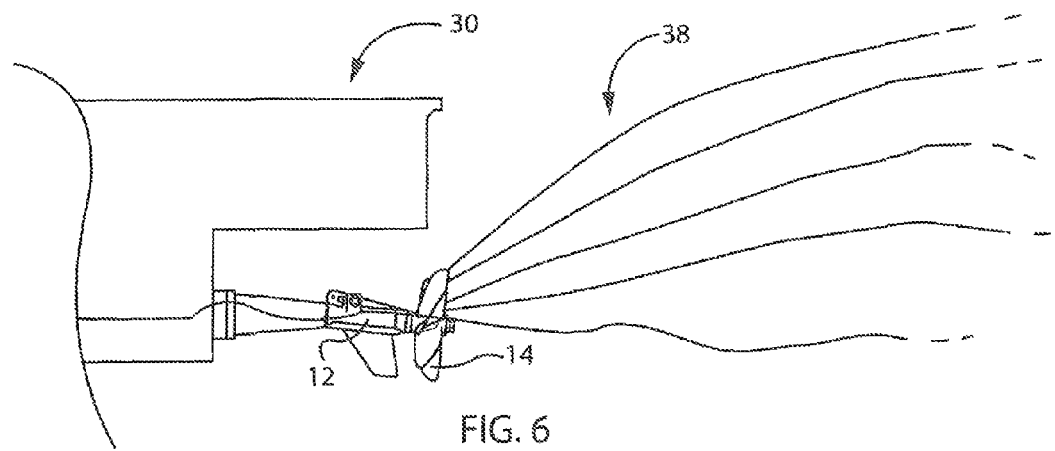
FIG. 6 illustrates a rooster tail being formed without a modifier.
Figure 7:
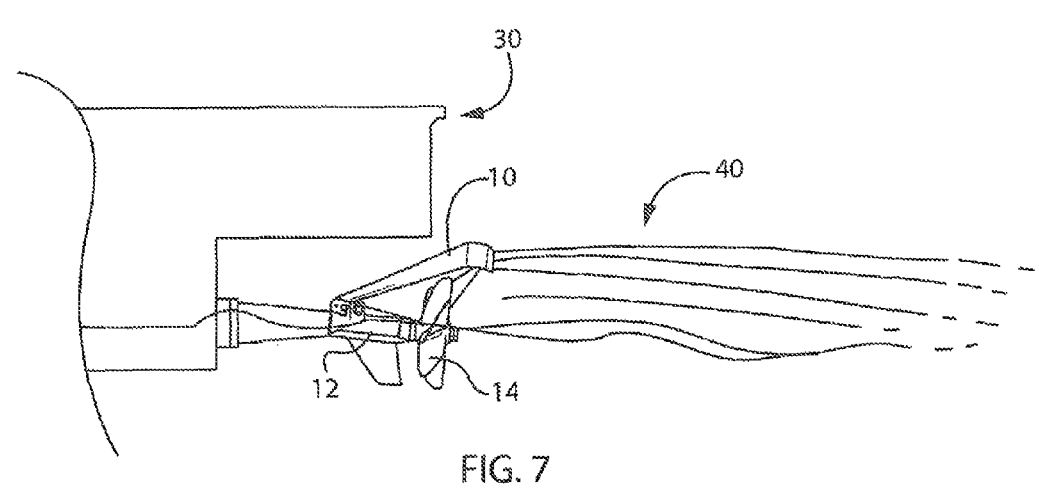
FIG. 7 illustrates a rooster tail being deflected with the device of FIG. 1.
Figure 8:
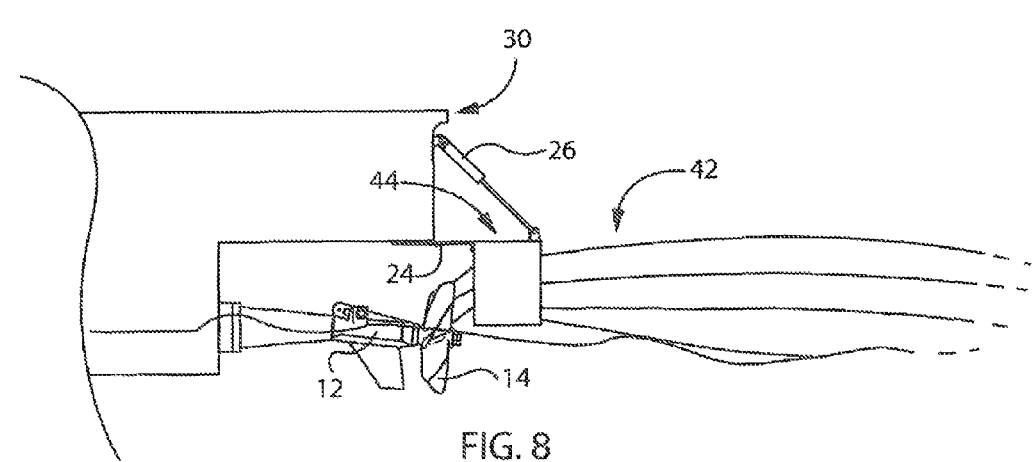
FIG. 8 illustrates a rooster tail being deflected with the device of FIG. 4.

FIG. 6 shows a surface drive propeller 14 fitted onto a marine vessel 30. As no modifier is used, the un-deflected rooster tail 38 may be seen to form a large arch of spray. FIG. 7, on the other hand, shows a modifier 10 attached to the drive housing 12 of a surface drive propeller 14. The deflected rooster tail 40 is shown to flow more parallel with the surface of the water and hull of the marine vessel 30. Additionally, FIG. 8 shows the grid modifier 44 forming a deflected rooster tail 42 that also flows more parallel with the surface of the water and the hull of the marine vessel 30. In this way, with particular reference to military use of surface drives, the signature rooster tail normally exhibited by a surface drive propeller, which is radar detectable, is virtually eliminated.

Although the preferred embodiments contemplated by the inventors of carrying out the present invention are disclosed above, practice of the present invention is not limited thereto. It will be manifest that various additions, modifications and rearrangements of the features of the present invention may be made without deviating from the spirit and scope of the underlying inventive concept.

What is claimed is:

1. An apparatus that suppresses a rooster tail generated by a marine surface drive, the apparatus comprising:
  a modifier including a modifier housing supported by at least one of a transom of a marine vessel and a drive housing;
  a plurality of vanes rigidly fixed to the modifier housing, wherein the plurality of vanes are fixed to an interior of the modifier housing and extend substantially orthogonally to the interior of the modifier housing, and wherein the plurality of vanes are configured to collectively deflect the rooster tail in an aft direction of the surface drive;
  at least one attachment device supporting the modifier to one of the drive housing and the transom and configured to selectively move the modifier in a deployed position engaging the vanes with the rooster tail wherein the rooster tail generated by the surface drive is deflected by the modifier housing and the plurality of vanes in a direction substantially parallel with an adjacent surface of the surrounding water and also move the modifier into a retracted position allowing the rooster tail to form without deflection while the marine vessel is in motion.

2. The apparatus of claim 1, the apparatus further comprising:
  a grid of rectangular channels with a plurality of vertical and horizontal vanes formed by the plurality of vanes rigidly fixed to the modifier housing; and
  an opening on a leading edge of each channel facing the transom and an opening on a trailing edge of each channel opposite the leading edge.

3. The apparatus of claim 2, wherein the channels are configured to flow the output water into the leading edge and out of the trailing edge and deflect the output water generated by the surface drive in a direction substantially parallel to a bottom surface of the marine vessel.

4. The apparatus of claim 3, the apparatus further comprising:
  at least one attachment member joining the modifier to the transom of the marine vessel; and
  wherein the attachment member is configured to articulate the modifier into a deployed position to deflect the output water and a retracted position to not deflect the output water.

5. The apparatus of claim 4, wherein the plurality of vanes includes parallel vanes vertically fixed to the modifier housing and parallel vanes horizontally fixed to the modifier housing.

6. The apparatus of claim 1, the apparatus further comprising at least one attachment member joining the modifier to the drive housing in a position trailing a propeller of the surface drive.

7. The apparatus of claim 6, wherein the modifier further includes:
   a first end and a second end opposite the first end, the first and second end sharing a common, horizontal plane;
   a leading edge facing the transom and a trailing edge opposite the leading edge with a curvature;
   a center portion between the first end and the second end, the center portion extending above the common, horizontal plane.

8. The apparatus of claim 7, wherein the plurality of vanes rigidly fixed to the modifier housing extend toward the common, horizontal plane.

9. The apparatus of claim 1, wherein the modifier is configured to articulate with respect to the drive housing.

10. A method of suppressing a rooster tail generated by a surface drive propeller comprising the steps of:
    providing a modifier movable between an engaged position and a disengaged position and supporting the modifier by at least one of a transom of a marine vessel and a drive housing, wherein the modifier includes a modifier housing and a plurality of vanes rigidly fixed to the modifier housing, wherein the plurality of vanes are fixed to an interior of the modifier housing and extend substantially orthogonally to the interior of the modifier housing, and wherein the plurality of vanes are configured to collectively deflect the rooster tail in an aft direction of the surface drive; and
    selectively positioning the modifier such that the modifier housing and the plurality of vanes and the modifier housing collectively deflect the rooster tail generated by the surface drive propeller in a direction substantially parallel to an adjacent surface of the surrounding water when the modifier is in the engaged position; and
    selectively positioning the modifier in the disengaged position such that the modifier housing and the plurality of vanes collectively do not deflect the rooster tail generated by the surface drive thus allowing the rooster tail to fully form.

11. The method of claim 10, further comprising the steps of:
    providing the modifier with a grid of channels formed with the plurality of vanes aligned vertically and horizontally at approximately right angles; and
    attaching the modifier to a transom of a boat such that the channels are approximately parallel to a hull surface of the boat.

12. The method of claim 11, further comprising the steps of:
    attaching a first portion of the modifier to the transom with an articulating attachment; and
    adjusting the modifier position to optimally capture the output water.

13. The method of claim 10, further comprising the steps of:
    attaching the modifier to the drive housing; and
    providing a curvature to the modifier housing in both a vertical and horizontal axis.

14. The method of claim 13, further comprising the steps of
    locating the modifier in a position trailing a vertical plane intersecting the surface drive propeller.

15. A rooster tail suppressor for a surface drive propeller comprising:
    a modifier attached to the transom of a boat and including a modifier housing;
    a first plurality of parallel vanes vertically fixed to the modifier housing; and
    a second plurality of parallel vanes horizontally fixed to the modifier housing;
    wherein the first and second plurality of vanes form right angles to one another respectively, and are configured to deflect output water generated by the surface drive propeller in a direction approximately parallel to the surface of the water when the modifier is in a deployed position;
    at least one attachment device joining the modifier to a transom of a marine vessel; and
    wherein the attachment device is configured to move the modifier in the deployed position to deflect the output water in a direction substantially parallel with a bottom surface of the boat and also move the modifier into a retracted position allowing a rooster tail to form.

16. The rooster tail suppressor of claim 15, wherein the modifier housing is configured to partially surround the first and second plurality of parallel vanes.

17. The rooster tail suppressor of claim 15, further comprising a plurality of channels formed with the first and second plurality of parallel vanes and the modifier housing, wherein the channels are configured to receive the output water on one end and expel the output water from an opposite end.

* * * * *